(12) United States Patent
Zhou et al.

(10) Patent No.: US 10,805,230 B2
(45) Date of Patent: Oct. 13, 2020

(54) CONTENT RESOURCE MANAGEMENT

(71) Applicant: EMC IP Holding Company LLC, Hopkinton, MA (US)

(72) Inventors: Wei William Zhou, Shanghai (CN); Chen Wang, Shanghai (CN); Wei Ruan, Shanghai (CN); Jason Muhua Chen, Shanghai (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 407 days.

(21) Appl. No.: 15/098,845

(22) Filed: Apr. 14, 2016

(65) Prior Publication Data
US 2016/0308949 A1   Oct. 20, 2016

(30) Foreign Application Priority Data

Apr. 17, 2015 (CN) .......................... 2015 1 0185150

(51) Int. Cl.
| | |
|---|---|
| *H04L 12/911* | (2013.01) |
| *G06F 16/955* | (2019.01) |
| *G06F 9/445* | (2018.01) |
| *H04L 12/24* | (2006.01) |
| *H04L 29/08* | (2006.01) |

(52) U.S. Cl.
CPC ........ *H04L 47/781* (2013.01); *G06F 9/44505* (2013.01); *G06F 16/9558* (2019.01); *G06F 16/9566* (2019.01); *H04L 41/0813* (2013.01); *H04L 67/34* (2013.01)

(58) Field of Classification Search
CPC ... H04L 47/781; H04L 41/0813; H04L 67/34; G06F 9/44505; G06F 17/30887; G06F 17/30882
See application file for complete search history.

(56) References Cited

U.S. PATENT DOCUMENTS

| | | | |
|---|---|---|---|
| 8,689,117 B1* | 4/2014 | Vasilik ................ | G06F 16/9577 715/760 |
| 2012/0059869 A1* | 3/2012 | Seo ................... | G06F 17/30893 709/202 |
| 2014/0095583 A1* | 4/2014 | Houle ............... | G06F 17/30905 709/203 |

FOREIGN PATENT DOCUMENTS

CN          102055773 A        5/2011

OTHER PUBLICATIONS

Gregorio, Joe, et al. "URI Template". No. RFC 6570. 2012. (Year: 2012).*

(Continued)

*Primary Examiner* — Caroline H Jahnige
(74) *Attorney, Agent, or Firm* — Brian J. Colandreo; Mark H. Whittenberger; Holland & Knight LLP

(57) ABSTRACT

Embodiments according to the present invention provide an apparatus, a computer program product and a method for content resource management by communicating with a content server to obtain a content resource stored in the content server; uploading a configuration component which defines a functionality interface for managing the content resource; managing the content resource obtained from the content server based on the configuration component.

19 Claims, 5 Drawing Sheets

Content Resources 300

(56) References Cited

OTHER PUBLICATIONS

Notification of the First Office Action in Chinese Application No. 2015101851509 dated Feb. 1, 2019.
Notification of the Second Office Action in Chinese Application No. 2015101851509 dated Jun. 12, 2019.
Notification of the Rejection Decision in Chinese Application No. 201510185150.9 dated Sep. 27, 2019.

* cited by examiner

CONTENT RESOURCE MANAGEMENT

RELATED APPLICATION

This application claim priority from Chinese Patent Application Number CN2015101851509, filed on Apr. 17, 2015 at the State Intellectual Property Office, China, titled "METHOD AND APPARATUS FOR CONTENT RESOURCE MANAGEMENT," the contents of which is herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present disclosure relate to content resource management.

BACKGROUND OF THE INVENTION

Representational State Transfer (REST) is a software architecture style, a designing and developing methodology for network applications, and may reduce complexity of development and improve extensibility of the system. Typically, REST may describe a group of architecture constraint conditions and principles, and applications or designs satisfying these constraint conditions and principles are of REST style, which may be considered RESTful.

Typically, REST application programming interface (API) may be referred to as an inter-operation interface often used between WEB application capabilities, i.e., a RESTful API, and a system corresponding to the RESTful API may become a RESTful system. Generally, system characteristics of REST style include: information open to the external may be resource; the resource may be identified by a conventional WEB uniform resource identifier (URI); and limited resource operations open to the external include addition, modification, deletion and retrieval.

Usually, in development of a REST system for a user, it may be common to develop content resource defaulted by a system, for example, a document, a file, a user, a group and so on, and create software or service for a data model of a system content management core, for example, develop a system REST service to provide REST API to implement some default behaviors such as document management and folder management with respect to the system default content resource.

Generally, when a user provides service for its own user (hereafter referred to as "terminal user"), it may be necessary to effectively manage a content resource. However, under a REST framework, in an existing manner, any management (e.g., modification, extension or the like) to a content resource requires a developer to develop a user's subscription resource, modify a system default content resource and define corresponding behaviors, i.e., modify a REST API which may already have been developed duly.

SUMMARY OF THE INVENTION

Example embodiments of the present disclosure provide a technical solution of facilitating and assisting a user to perform content resource management In one embodiment a method for content resource management may include communicating with a content server to obtain a content resource stored in a content server; uploading a configuration component which defines a functionality interface for managing the content resource; and managing the content resource obtained from the content server based on the configuration component.

BRIEF DESCRIPTION OF DRAWINGS

Principles of the present disclosure are described below by means of several exemplary embodiments as shown in the accompanying drawings. It should be understood that these embodiments are described only for enabling those skilled in the art to better understand and further implement the present invention, rather for limiting the scope of the present invention in any manner.

DETAILED DESCRIPTION

Figure 1:
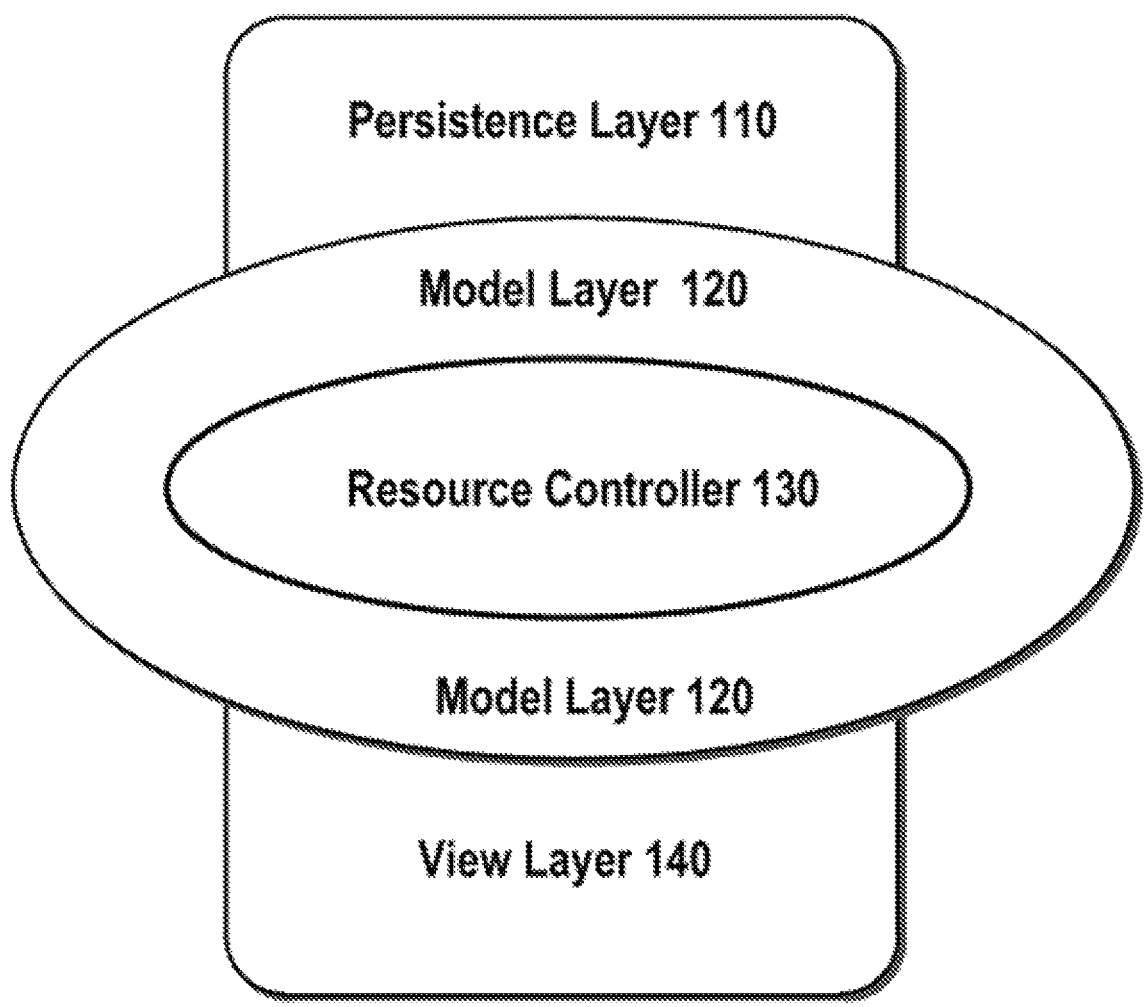
FIG. 1 is a schematic view of an exemplary server implementation architecture which can be used to support an embodiment of the present disclosure.

Principles of the present disclosure are described below by means of several exemplary embodiments as shown in the accompanying drawings. It should be understood that these embodiments are described only for enabling those skilled in the art to better understand and further implement the present invention, rather for limiting the scope of the present invention in any manner.

References in the specification to "one embodiment", "an embodiment", "a preferred embodiment" etc., indicate that the embodiment described may include a particular feature, structure, or characteristic, but every embodiment may not necessarily include the particular feature, structure, or characteristic. Moreover, such phrases are not necessarily referring to the same embodiment. It should also be understood that various terminology used herein is for the purpose of describing particular embodiments only and is not intended to be liming of the disclosure. As used herein, the singular forms "a", "an" and "the" may include the plural forms, unless the context clearly indicates otherwise. It will be further understood that the terms "comprises", "has" and "including" used herein, specify the presence of stated features, elements, and/or components etc., but do not preclude the presence of one or more other features, elements, components and/or combinations thereof. For example, the term "multiple" used here indicates "two or more"; the term "and/or" used here may comprise any or all combinations of one or more of the items listed in parallel. Definitions of other terms will be specifically provided in the following description. Furthermore, in the following description, some functions or structures well-known to those skilled in the art will be omitted in order not to obscure embodiments of the disclosure in the unnecessary details.

To solve existing embodiments according to the present disclosure provide a technical solution of facilitating and assisting a user to perform content resource management. One embodiment may include a method for content resource management. A further embodiment may include communicating with a content server to obtain a content resource stored in a content server. A further embodiment may include uploading a configuration component which defines a functionality interface for managing a content resource. A further embodiment may include managing a content resource obtained from a content server based on a configuration component.

In a further embodiment, managing a content resource obtained from a content server based on a configuration component may include uploading user-customized content resource from a content server based on a configuration component, wherein a user-customized content resource may be different from a system default content resource. According to as alternate or additional embodiment, managing a content resource obtained from a content server based on a configuration component may include representing a view of a content resource obtained from a content server at least based on a configuration component. According to a further alternate or additional embodiment, managing a content resource obtained from a content server based on a configuration component may include deactivating one or more content resources in a content resource obtained from a content server based on a configuration document.

One embodiment may include an apparatus for content resource management. A further embodiment may include a communication layer unit that may be configured to communicate with a content server to obtain a content resource stored in a content server. A further embodiment may include an uploading unit configured to upload a configuration component which defines a functionality interface for managing a content resource. A further embodiment may include a content resource management unit configured to manage a content resource obtained from a content server based on a configuration component.

According to an embodiment, a content resource management unit may be configured to upload user-customized content resource from a content server based on a configuration component, wherein a user-customized content resource may be different from a system default content resource. According to an alternate or additional embodiment, a content resource management unit may be configured to represent a view of a content resource obtained from a content server at least based on a configuration component. According to an alternate or additional embodiment, a content resource management unit may be configured to deactivate one or more content resources in a content resource obtained from a content server based on a configuration component.

One embodiment may include an application server which may include an apparatus for content resource management as disclosed above. In one embodiment, an application server may include one or more processors and a memory in which computer program instructions may be stored. In a further embodiment, when one or more processors execute computer program instructions, an application server may be enabled to execute a method for content resource management as disclosed previously.

One embodiment may include a computer program product including computer program instructions, wherein when a computing device executes the computer program instructions, the computing device may be enabled to execute the method for content resource management as disclosed previously.

In one embodiment, a functionality interface for managing a content resource may be provided in a configuration component so that a user can easily manage a content resource according to needs by setting the functionality interface in a configuration component, needless to re-develop an application programming interface and behavior provided by a system.

FIG. 1 is a schematic view of an exemplary application server implementation architecture 100 which can be used to support an embodiment of the present disclosure. The exemplary server implementation architecture for supporting an embodiment of the present disclosure for example may be Spring REST MVC (Model View Controller) developed based on Spring architecture. Depictions of the Spring REST MVC here are only intended to present an exemplary server implementation architecture but not to use any details of the example to limit the scope of the present disclosure. Those skilled in the art may appreciate that embodiments according to the present disclosure may also be supported using any other suitable pertinent architecture.

Specifically, in the exemplary embodiment shown in FIG. 1, server implementation architecture 100 may be a core REST MVC. Server implementation architecture 100 shown in FIG. 1 comprises four layers, namely, persistence layer 110, model layer 120, resource controller 130 and view layer 140. In the application server system, from communication to representation, a content resource (e.g., a document, a folder, and a user) needs to pass through the above four layers.

Persistence layer 110 is a wrapper of an API (e.g., DFC (Documentum Foundation Classes) API) with session manager awareness to the login. The persistence layer API provided by persistence layer 110 can implement communication between a client and the server. The input and output of the persistence APIs is the model class. A result outputted at persistence layer 110 to the resource controller is a serializable model.

Model layer 120 is used to store a data structure (e.g., Java data structure) of programming language of data, and is a serializable model (directly serialized into XML (Extensive Markup Language) or JSML (Java Speech API Markup Language) or inversely serialized into a model from XML or JSML).

Resource controller layer 130 defines a resource HTTP interface. Resource controller layer 130 for example may define a location of the accessed resource, namely uniform resource identifier (URI), and define a request method of access (e.g., create request, delete a request, and add a request) and parameters in the request. The output of resource controller layer 130 is a model.

View layer 140 defines a representation of properties of the content resource, links and other features. Usually, a content server comprises a data memory and a database. Content data of a content resource object is stored in the data memory, and properties of the content resource object are stored in the database as metadata.

According to embodiments of the present disclosure, to enable implementation of management of the content resource, uploading of a configuration component (not shown in FIG. 1) is introduced to perform management for the content resource upon activation (deployment and/or operation).

Figure 2:
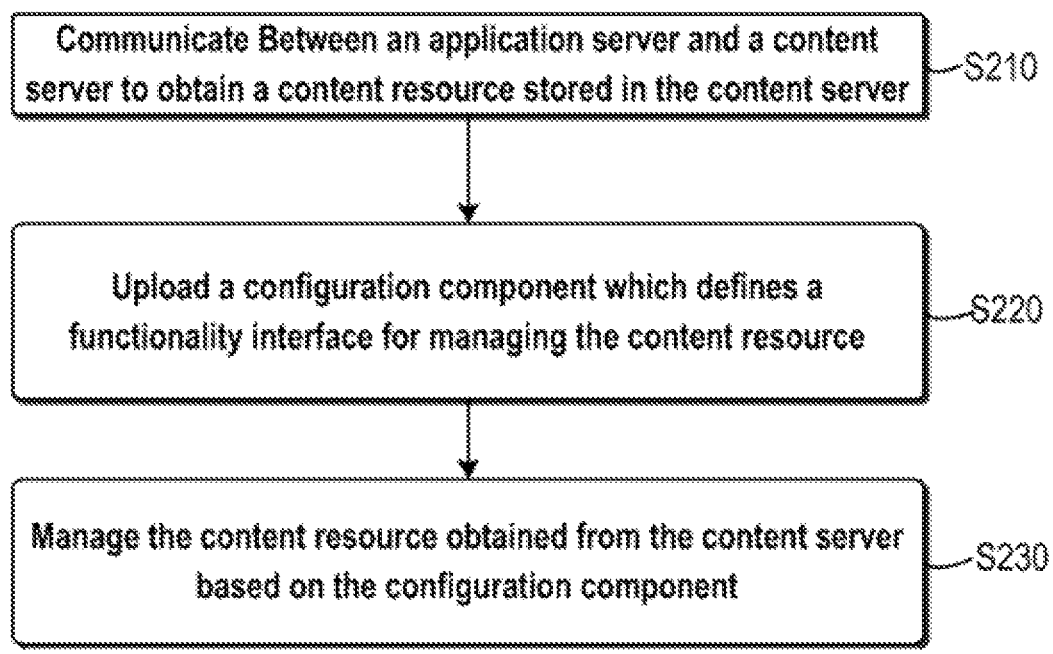
FIG. 2 is a flow chart of a method for implementing content resource management according to an embodiment of the present disclosure.

FIG. 2 is a flow chart of a method for implementing content resource management according to an embodiment of the present disclosure. As shown in FIG. 2, in step S210, an application server communicates with a content server to obtain the content resource stored in the content server. For example, as stated above, the application server may communicate with the content server via persistence layer 110. In step S220, the configuration component is uploaded and defines a functionality interface for managing the content resource. In step S230, the content resource obtained from the content server is managed based on the configuration component.

Management of the content resource is discussed in details by describing specific embodiments.

Extending the Content Resource

Figure 3:
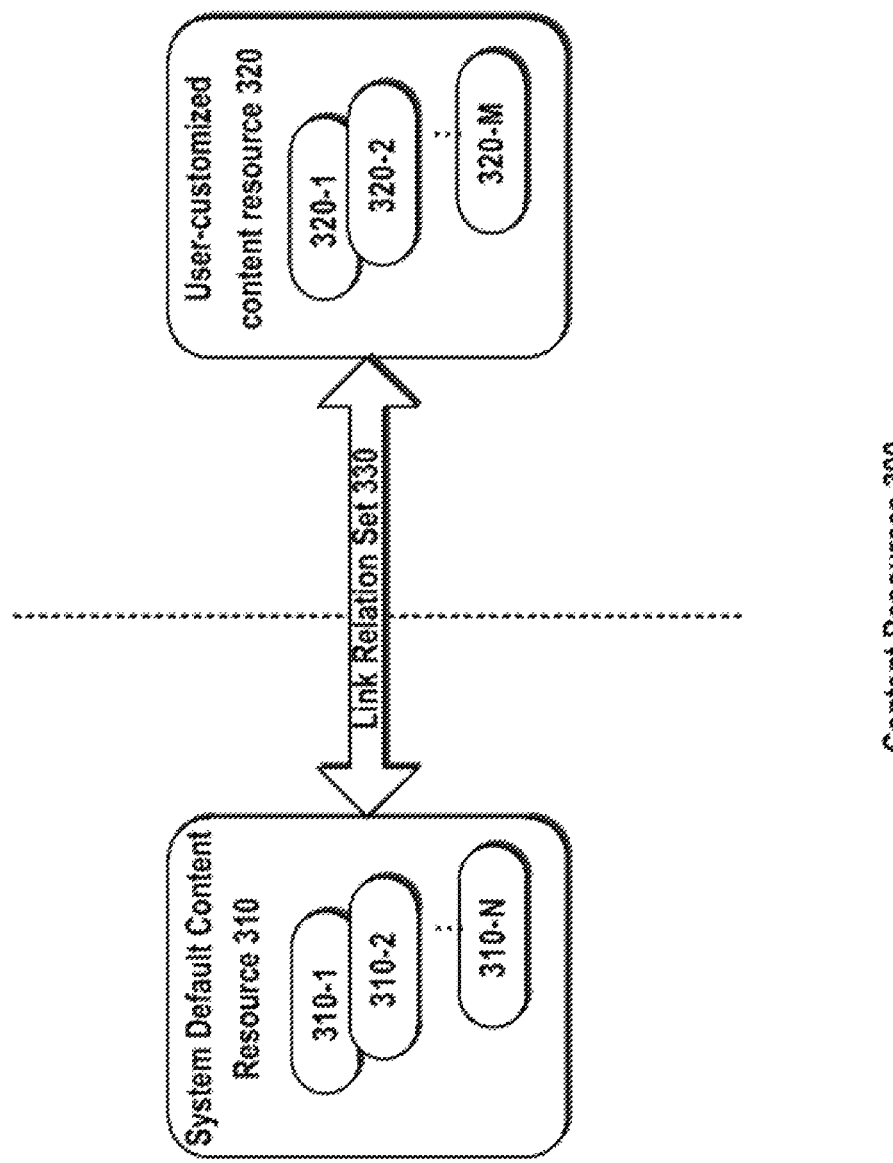
FIG. 3 is a schematic view showing content resource, wherein the content resource comprises added user customization content resource and system default content resource.

As far as customization resource development as concerned, a user might need to extend new content resource. FIG. 3 is a schematic view showing content resource. Content resource 300 includes system default content resource 310 and user-customized content resource 320 to be added, wherein system default content resource 310 may include one or more content resource items 310-1, 310-2, . . . 310-N, which are already duly developed by a developer for the system, and a link relation (not shown) exists between these content resource items. User-customized content resource 320 may include one or more content resource items 320-1, 320-2, . . . , 320-M, which have a user-customized link relation (not shown) there-between. Any content resource item (e.g., one or more of 310-1, 310-2, . . . , 310-N) in system default content resource 310 may have a set 330 of link relations with one or more content resource items 320-1, 320-2, . . . , 320-M in user-customized content resource 320, wherein all link relations may exist between the content resource items in the system default content resource 310 and the content resource items in the user-customized content resource 320. Although set 330 of link relations is shown as a double-sided arrow in FIG. 3, it should be appreciated that each link relation in set 330 of the link relations is always unidirectional. Upon extending the content resource, the user might need to add a link relation to one or more content resource items in system default content resource 310 so as to properly link system default content resource 310 with user-customized content resource 320. In some embodiments, original association may be broken upon configuration. In some other embodiments, the system may automatically detect association between resources, and modify the link relation between resource items according to corresponding functionality (e.g., addition, deactivation or the like) upon uploading the configuration component.

In an embodiment of extending the content resource, step S230 in FIG. 2 may include uploading a user-customized content resource from the content server based on the configuration component. In a further embodiment, a user-customized content resource (e.g., as shown by the reference number 320) may be different from a system default content resource (e.g., as shown by the reference number 310). In a further embodiment, a link between an already-existing resource item and an extended user-customized content resource item may be added. In a further embodiment, a user needs to control how a user-customized resource item may be linked with a system default content resource. In a further embodiment, a user may know which links need to be added from a user-customized resource to a system default content resource. In a further embodiment, a user needs to control how a system default content resource may reach a user-customized resource.

In some embodiments, a functionality interface of a configuration component may include a customized content resource registration interface. In a further embodiment, a customized content resource registration interface at least may designate: a content resource name of a user-customized content resource; a link relation between a user-customized content resource and a system default content resource; and information related to a uniform resource identifier of a user-customized content resource.

In some embodiments, information related to a uniform resource identifier of a user-customized content resource designated in a customized content resource registration interface may be a URI of a content resource. In some other alternative and additional embodiments, information related to a uniform resource identifier of a user-customized content resource designated in a customized content resource registration interface may include a uniform resource identifier template. In some other embodiments, a uniform resource identifier of a user-customized content resource may be generated according to a uniform resource identifier template. In some other embodiments, if a uniform resource identifier template includes one or more variables, a customized content resource registration interface may further designate a mapping relation between a variable in a uniform resource identifier template and a property of a user-customized content resource.

As a specific example embodiment, in accordance with a specific implementation of a configuration component, in a REST archived file, for example, a YAML file rest-api-custom-resource-registry.yaml may provide a customized content resource registration interface resource-link-registry, to designate a user-customized content resource to be added and add a relevant link relation to a system default content resource.

An exemplary grammar for the customized content resource registration interface is presented as follows:

resource-link-registry:
        resource: <resource code name>
        link-relation: <new link relation name>
        uri-template: <name of a URI template defined in uri-template-registry, optional>
        value-mapping: <an property name from the resource to parse a variable value in the URI template, optional>

The following Table 1 presents detailed description of the customized content resource registration interface.

TABLE 1

| KEY | VALUE |
|---|---|
| Resource compulsory | A resource code name to which a link needs to added. Each core resource has a sole code name. |
| link-relation compulsory | The link-relation name of a newly-added link |
| uri-template optional | A URI template name registered in uri-template-registry. The URI template may comprise one or more variables which should be parsed during generation of a hypertext reference (href) of the link-relation. |
| value-mapping optional | The value-mapping is used to parse a path variable defined in the URI template or inquire a value of a parameter. An exemplary format of the value-mapping may be: [variableName1:propertyName1[,variableName2:propertyName2]    variableName is defined by the URI template.    propertyName is defined by a resource object. When the URI is generated in runtime, the variables are replaced with property values, and the property may have plural values. When any properties in the variables have |

TABLE 1-continued

| KEY | VALUE |
|---|---|
| | plural values, a plurality of links will be generated, and each link has a different value in a variable segment. In addition, a "title" attribute will be set for a link representation to differentiate href of different values. At most only one multi-value property can exist in the variable. If the property values for the variables are not returned to the resource object (e.g., by custom view), the link will neither be generated and nor be represented on the resource. |

In an example embodiment, a customized content resource registration interface may be specifically configured as follows to add resource "object" and add a resource "object" to a link-relation 'http://identifiers.emc.com/linkrel/acl' of a system default content resource "acl":
   resource-link-registry:
      resource: object
         link-relation: 'http://identifiers.emc.com/linkrel/acl'
         uri-template: X_ACL_RESOURCE_TEMPLATE
         value-mapping: [objectId:r_object_id]

In this example embodiment, information related to a uniform resource identifier of a user-customized content resource may be generated by a uniform resource identifier template X_ACL_RESOURCE_TEMPLATE.

In some embodiments, a uniform resource identifier template may be defined in a template registration interface uri-template-registry of a control module. In a further embodiment, an exemplary grammar of a template registration interface is presented as follows:
   uri-template-registry:
      name: <template name>
         [href|hreftemplate]: <URI template mode for lire or 'hreftemplate'>
<an encoding method for a special character, optional>
<whether the identifier is an external template, optional>

In an example embodiment, in the above example, a uniform resource identifier template X_ACL_RESOURCE_TEMPLATE may be defined as:
   uri-template-registry:
      name: X_ACL_RESOURCE_TEMPLATE
         href: '{repositoryUri}/objects/{objectId}/acl{ext}'
Furthermore, as a uniform resource identifier template X_ACL_RESOURCE_TEMPLATE include a variable objectId, a mapping relation value-mapping: [objectId:r_object_id] between variables in a uniform resource identifier template and properties of a user-customized content resource needs to be designated in a customized content resource registration interface resource-link-registry.

According to some embodiments, a system core home document may be provided to designate all root resources. In some other embodiments, if an added user-customized resource may include root content resource, to which no upper-layer resource is linked, a developer may modify a system core home document to register a root content resource. In some other embodiments, once a user-customized root resource is registered, a system core home document may include additional entries for a root content resource to facilitate link with the user-customized content resource.

In some embodiments, the above examples may describe in detail how to extend a content resource through a configuration component. In some other embodiments, a user may perform relevant configuration in a configuration component by using a customized content resource registration interface. In some other embodiments, in an application deployment phase, it may be feasible to upload a user-customized content resource and create a link-relation between a user-customized content resource and a system default content resource based on an uploaded configuration component, e.g., resource controller layer 130. In some other embodiments, view layer 140 may represent a property of a user-customized content resource and a link-relation between it and a system default content resource.

Customizing a Content Resource View

A view is a portion of an application for processing data display. Usually a view, e.g., view layer 140, is created according to the model data. Each content resource item defines a view, e.g., what properties and links of the content resource are exhibited in the view.

In some embodiments, a user might need to customize a desired content resource view without using a view defaulted by a system to represent the system default content resource. In some other embodiments, in case of extending a content resource, a user probably desires to customize a content resource view for a user-customized content resource.

According to some embodiments, step S230 in FIG. 2 may include a view representing a content resource obtained from a content server at least based on a configuration component. In an exemplary embodiment, view layer 140 may be configured with an interface to facilitate reading an uploaded configuration component so as to combine a user configuration in the configuration component with a system-defined view to finally represent a content resource items.

According to one or more embodiments, a functionality interface of a configuration component may include a content resource view registration interface. In some embodiments, a content resource view interface at least may designate: a name of content resource wherein a user is represented; and may designate information of a represented content resource view. In some embodiments, a content resource designated by a content resource view interface may include system default content resource and/or user-customized content resource. In some other embodiments, a user may customize a view of either a system default content resource or a user-customized content resource through a configuration component.

In a further embodiment, a practical grammar of a content resource view registration interface may be as presented below:
   resource-view-registry:
      resource: <resource code name>
      view: <a standard name of a class of the user-customized view>

In an example embodiment, a user may desire to customize a resource repository using a compiled class, and then an exemplary content resource view registration interface may be as follows:
   resource-view-registry:
      resource: repository
      view: [org.acme.view.impl.custom.RepositoryViewExtend]

In some embodiments, those skilled in the art may understand that a user may customize a view representing a content resource according to needs by writing a code for customizing a view. In an example embodiment, a user may modify/replace a view of a content resource item, customize some properties/links not displaying (concealing) a certain content resource item, and may even customize without displaying (concealing) one or more special content resource items.

Deactivating the Content Resource

In one embodiment, a developer may develop REST service to provide REST API to implement some default behaviors such as document management and folder management with respect to a system default content resource. In a further embodiment, a user might not hope a terminal user to operate some content resources directly. In a further embodiment, in document resource management, default behaviors such as locking, modifying and providing a new version may be provided. In a further embodiment, a user might not hope a terminal user to perform some operations thereon such as modification.

According to one or more embodiments, step S230 in FIG. 2 for example may include: deactivating one or more content resources in content resources obtained from a content server based on a configuration document. In an exemplary embodiment, resource controller 140 may read an uploaded configuration component to control not to upload a deactivated one or more content resources in an application deployment phase; and remove a link relevant to a deactivated content resource while uploading other content resources except for the deactivated content resources. In some embodiments, alternatively or additionally, resource controller 140 may further be configured not to upload those content resources that only linked with a deactivated content resource (i.e., lower-layer resources of the deactivated content resources).

According to one embodiment, a functionality interface of a configuration component may include a deactivated content resource registration interface. In a further embodiment, through a deactivated content resource registration interface, a user may at least designate a name of the deactivated content resource.

In one embodiment, an exemplary grammar for a deactivated content resource registration interface is given below:

disabling-resource-registry:
   resource: [<name1>, <name2>, . . . ] <a listing of code names of deactivated resources>

According to one or more embodiments, alternatively or additionally, view layer 140 may not represent a view of a link related to a deactivated content resource while representing views of other content resources except for the deactivated content resources. In a further embodiment, a terminal user cannot access a deactivated resource through a represented link relation.

Alternatively or additionally, in some embodiments, if a query result of a terminal user involves a deactivated content resource (e.g., includes a link directed to the deactivated content resource, or has a property directed to the deactivated content resource), a view layer 140 may be configured not to represent a link relation related to a corresponding deactivated content resource. In a specific embodiment, after a communication result of a query operation is obtained through persistence layer 110, view layer 140 may be configured to be based on a configuration component and not to represent a link directed to a deactivated content resource based. In a further embodiment, a terminal user may not be linked to a deactivated content resource through a query result.

Alternatively or additionally, in some other embodiments, if properties of some content resources include a link and a content resource to which a link is directed has already been deactivated, a view layer 140 may be configured not to represent a link to a terminal user. In one or more embodiments, if the deactivated one or more content resources include root content resources, the deactivated root resources may be removed from the system core home document so that the link with the deactivated root resources cannot be achieved through the system core home document.

In some embodiments, resource controller 140 may determine which content resource needs to be deactivated by detecting a configuration component when an application is deployed to an application server, so as not to upload a corresponding content resource any more. In a further embodiment, from a security perspective, in this manner, a terminal user cannot find a deactivated resource through any link relation, thereby enabling safer management of resources.

Alternatively or additionally, in some embodiments, if a terminal user attempts to access a deactivated content resource through a URI corresponding to a deactivated content resource, a system may be designed to return a corresponding error state code. Alternatively or additionally, in some embodiments, if a terminal user requests to create an example with respect to an already-deactivated content resource, a system may be designed to return a corresponding error state code to reject a terminal user's request.

Those skilled in the art may appreciate that although many specific embodiments are presented in the preceding text with respect to a deactivated functional item of content resource, a developer may design by needs how to deactivate a resource and/or link relation related to a deactivated content resource (e.g., via a resource controller 130), and may further design by needs how to process view representation after a content resource may be deactivated (e.g., via a view layer 140). The embodiments described above all provide an advantageous technical effect, but embodiments disclosed are not exhaustive, and other proper embodiments/implementations that can be envisaged by those skilled in the art are also included in the scope of the present disclosure.

Noticeably, in some embodiments, content resource management schemes are described respectively based on three specific examples, namely, extending content resource, customizing content resource view, and deactivating content resource, and those skilled in the art may appreciate that the above three examples described separately may be applied in any suitable combinations, without falling outside the scope of the present disclosure. In an example embodiment, a deactivated content resource may be combined with an extension of content resource, thereby achieving replacement of current content resource by configuring in a configuration component. Those skilled in the art may envisage and use more combined configurations to implement a desired content resource management function.

It also needs to be appreciated that although only three specific examples are presented for a function item provided by a configuration component, these example embodiments are not exhaustive or restrictive. In an example embodiment, a concealing property registration interface may be defined individually for a concealing property function so that a resource management unit, e.g., resource controller layer 130 and/or view layer 140, may achieve concealing of a designated property according to user customization. Those skilled in the art may define more function items so that a system can achieve a corresponding function after a configuration component is uploaded.

Figure 4:
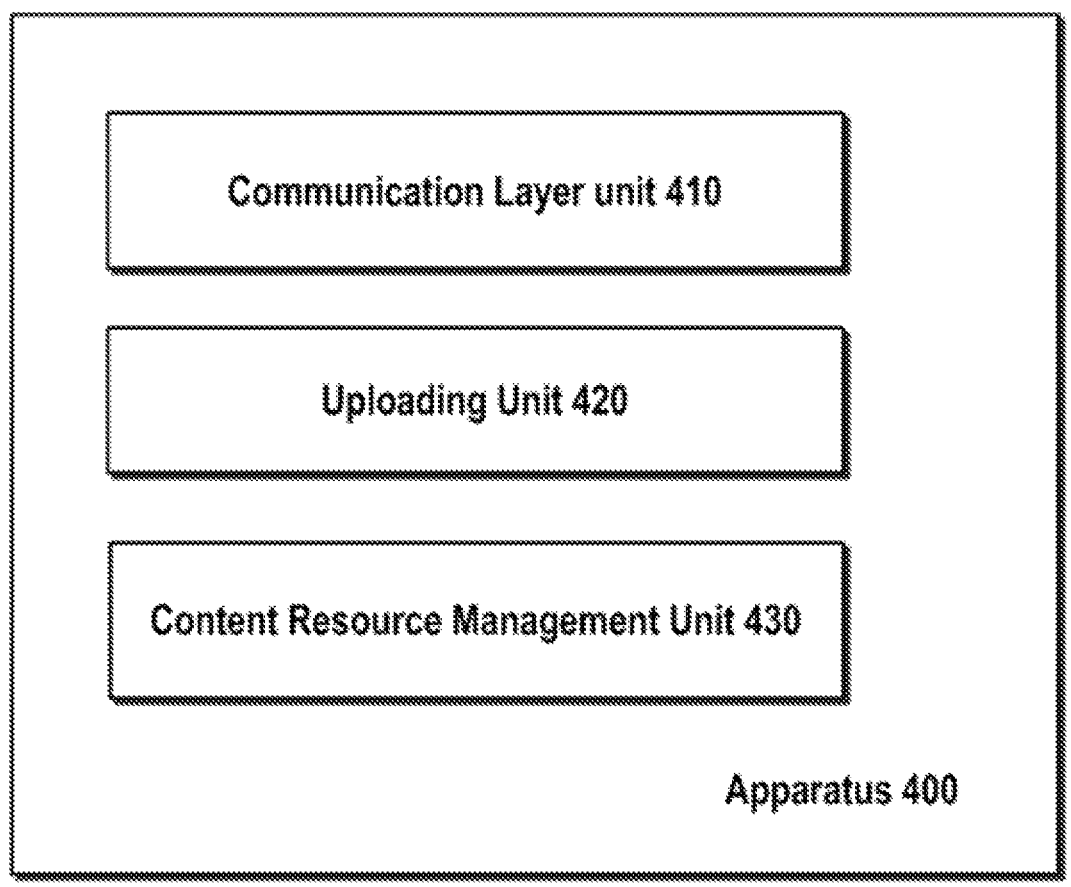
FIG. 4 is a block diagram of an apparatus for implementing content resource management according to an embodiment of the present disclosure.

FIG. 4 is a block diagram of an apparatus for implementing content resource management according to an embodiment of the present disclosure. As shown in FIG. 4, apparatus 400 for implementing content resource management according to an embodiment of the present disclosure comprises: communication layer unit 410, uploading unit 420 and content resource management unit 430.

Communication layer unit 410 is configured to communicate with a content server to obtain a content resource stored in the content server. Uploading unit 420 is configured to upload a configuration component which defines a functionality interface for managing a content resource. Content resource management unit 430 is configured to manage a content resource obtained from a content server based on an uploaded configuration component.

According to one or more embodiments, content resource management unit 430 may be configured to upload a user-customized content resource from a content server based on a configuration component. In some embodiments, a user-customized content resource may be different from a system default content resource. In some embodiments, a functionality interface of a configuration component may include a customized content resource registration interface. In some embodiments, a customized content resource registration interface may at least designate: content resource name of a content resource customized by the user; link relation between a user-customized content resource and a system default content resource; and information related to a uniform resource identifier of a user-customized content resource. In some embodiments, information related to a uniform resource identifier of a user-customized content resource may include a uniform resource identifier template. In some embodiments, a pre-defined uniform resource identifier template may be used to generate a uniform resource identifier of a user-customized content resource to improve an efficiency of generating the URI. In some embodiments, if a uniform resource identifier template includes a variable, a customized content resource registration interface may further designate a mapping relation between the variable in a uniform resource identifier template and a property of the user-customized content resource. In some embodiments, if a user-customized content resource is root content resource, a content resource management unit may be configured to register a user-customized content resource in a system core home document based on a configuration component, whereby a user-customized content resource may be linked through a system core home document.

According to one or more embodiments, content resource management unit 430 may be configured to represent a view of a content resource obtained from the content server at least based on the configuration component. In some embodiments, a functionality interface of a configuration component for example may include a content resource view registration interface. In some embodiments, a content resource view interface may at least designate a name of content resource wherein a user may be represented; and information for designating a represented content resource view. In some embodiments, a represented content resource may comprise a system default content resource, or a user-customized content resource, or both of them.

According to one or more embodiments, a content resource management unit 430 may be configured to deactivate one or more content resources in a content resource obtained from a content server based on a configuration component. In a specific embodiment, content resource management unit 430 may be configured not to upload a deactivated one or more content resources, and content resource management unit 430 may be configured to remove a link relevant to a deactivated content resource while uploading other content resources except for a deactivated content resources. Alternatively or additionally, in some embodiments, content resource management unit 430 may be configured not to represent a view of a link related to a deactivated content resource while representing views of other content resources except for deactivated content resources. In an embodiment, if deactivated one or more content resources include root content resources, content resource management unit 430 may be configured to remove deactivated root resources from a system core home document so that a terminal user cannot link with deactivated root resources through a system core home document. In one or more embodiments, a functionality interface of a configuration component may include a deactivated content resource registration interface. In some embodiments, a deactivated content resource registration interface may at least designate a name of a deactivated content resource.

According to some embodiments, a functionality interface for managing a content resource may be provided in a configuration component so that a user may easily manage content resources according to needs by setting a functionality interface in a configuration component, needless to re-develop an application programming interface and behavior provided by a system.

Figure 5:
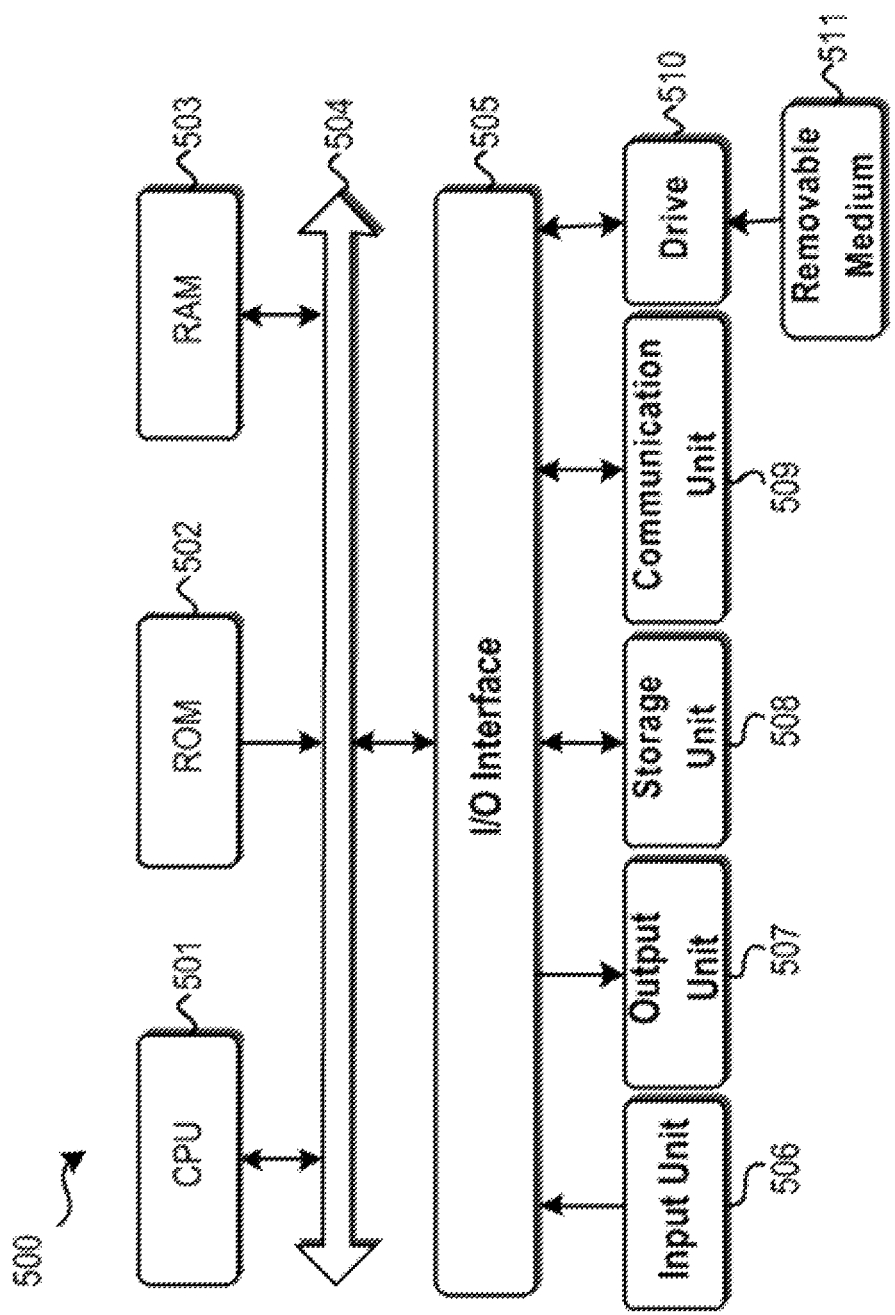
FIG. 5 is a block diagram of an exemplary computing system which can be used to implement the embodiment according to the present disclosure.

FIG. 5 is a block diagram of an exemplary computing system which can be used to implement the embodiment according to the present disclosure. FIG. 5 depicts a block diagram of an exemplary computer system 500 suitable for implementing example embodiments disclosed herein. As depicted in FIG. 5, computer system 500 comprises a central processing unit (CPU) 501 which is capable of performing various processes in accordance with a program stored in read only memory (ROM) 502 or a program loaded from storage unit 508 to random access memory (RAM) 503. In RAM 503 are stored various programs and data as required by operation of apparatus 400. CPU 501, ROM 502 and RAM 503 are connected to one another via bus 504. Input/output (I/O) interface 505 is also connected to bus 504.

The following components are connected to I/O interface 505: input unit 506 including a keyboard, a mouse, or the like; output unit 507 including a display such as a cathode ray tube (CRT), a liquid crystal display (LCD), or the like, and a loudspeaker or the like; storage unit 508 including a hard disk or the like; and a communication unit 509 including a network interface card such as a LAN card, a modem, or the like. Communication unit 509 performs a communication process via the network such as the Internet. Drive 510 is also connected to I/O interface 505 as required. Removable medium 511, such as a magnetic disk, an optical disk, a magneto-optical disk, a semiconductor memory, or the like, is mounted on drive 510 as required, so that a computer program read therefrom is installed into storage unit 508 as required.

Embodiments of the present invention may be implemented in software, hardware, application logic or software, a combination of hardware and application logic. In exemplary embodiments, application logic, software or a set of instructions is maintained on any one of various conventional computer-readable media. In the context of the text, "computer-readable media" may be any media or device that includes, stores, transfers, propagate or transmit instructions related to an instruction executing system, device or apparatus such as a computer or used by the instruction executing system, device or apparatus such as a computer. The computer-readable media may comprise computer-readable storage media which may be any media or device that can include or store instructions related to an instruction executing system, device or apparatus such as a computer or used by the instruction executing system, device or apparatus such as a computer.

Different functions discussed here may be executed in different orders and/or executed concurrently if necessary. Besides, one or more functions among the above functions may be optional or may be combined if necessary. Although aspects of the present disclosure are illustrated in independent claims, other aspects of the present disclosure include other combinations of features from the embodiments and/or features of claims dependent from independent claims, and do not merely include the combinations explicitly recited in claims. It is noticeable here that although exemplary embodiments of the present disclosure are depicted, these depictions are not construed as limiting the present disclosure. On the contrary, diverse variations and modifications may be made without departing from the scope of the present disclosure as defined by the claim set.

What is claimed is:

1. A method for content resource management, the method comprising:
   communicating with a content server to obtain a content resource stored in the content server;
   uploading a configuration component defining a functionality interface for managing the content resource including automatically detecting an association between content resources and modifying a link relation between resource items;
   managing the content resource obtained from the content server based on the configuration component, wherein managing the content resource obtained from the content server based on the configuration component includes:
      uploading a user-customized content resource from the content server based on the configuration component, wherein the user-customized content resource is different from a system default content resource;
      registering the user-customized content resource in a system core home document based on the configuration component, whereby the user-customized content resource is linked through the system core home document; and
      deactivating one or more content resources in the content resource obtained from the content server based on the configuration component, wherein deactivating the one or more content resources includes removing a link relevant to a deactivated content resource while uploading other content resources except for the deactivated content resources.

2. The method according to claim 1, wherein managing the content resource obtained from the content server based on the configuration component comprises:
   representing a view of the content resource obtained from the content server at least based on the configuration component.

3. The method according to claim 2, wherein the functionality interface of the configuration component comprises a customized content resource registration interface, wherein the customized content resource registration interface at least designates:
   a content resource name of the user-customized content resource;
   a link relation between the user-customized content resource and the system default content resource; and
   information related to a uniform resource identifier of the user-customized content resource.

4. The method according to claim 3, wherein the information related to the uniform resource identifier of the user-customized content resource comprises a uniform resource identifier template, wherein the uniform resource identifier of the user-customized content resource is generated based on the uniform resource identifier template.

5. The method according to claim 4, wherein the customized content resource registration interface further designates:
   a mapping relation between a variable in the uniform resource identifier template and a property of the user-customized content resource.

6. The method according to claim 3, wherein the functionality interface of the configuration component comprises a content resource view registration interface, and the content resource view interface at least designates:
   a name of content resource wherein a user is represented;
   information for designating a represented content resource view.

7. The method according to claim 6, wherein the represented content resource comprises at least one of the system default content resource and the user-customized content resource.

8. The method according to claim 2, wherein deactivating one or more content resources in the content resources obtained from the content server comprises at least one of:
   not uploading one or more content resources deactivated; and
   not representing a view of a link related to the deactivated content resource while representing views of other content resources except for the deactivated content resources; and
   if the deactivated one or more content resources include root content resources, removing the deactivated root resources from the system core home document so that the deactivated root resources cannot be linked through the system core home document.

9. The method according to claim 8, wherein
   the functionality interface of the configuration component comprises a deactivated content resource registration interface at least used to designate a name of the deactivated content resource.

10. An apparatus for content resource management, the apparatus comprising:
    a memory; and
    one or more processors configured for:
       communicating with a content server to obtain a content resource stored in the content server;
       uploading a configuration component defining a functionality interface for managing the content resource including automatically detecting an association between content resources and modifying a link relation between resource items;
       managing the content resource obtained from the content server based on the configuration component, wherein managing the content resource obtained from the content server based on the configuration component includes:
          uploading a user-customized content resource from the content server based on the configuration component, wherein the user-customized content resource is different from a system default content resource;
          if the user-customized content resource is a root content resource, registering the user-customized content resource in a system core home document based on the configuration component, whereby the user-customized content resource is linked through the system core home document; and deactivating one or more content resources in the content resource obtained from the content server based on the configuration component, wherein deactivating the one or more content resources includes removing a link relevant to a deactivated content resource while uploading other content resources except for the deactivated content resources.

11. The apparatus according to claim 10, wherein managing the content resource obtained from the content server based on the configuration component comprises:

representing a view of the content resource obtained from the content server at least based on the configuration component.

12. The apparatus according to claim 11, wherein the functionality interface of the configuration component comprises a customized content resource registration interface, wherein the customized content resource registration interface at least designates:

a content resource name of the user-customized content resource;

a link relation between the user-customized content resource and the system default content resource; and information related to a uniform resource identifier of the user-customized content resource.

13. The apparatus according to claim 12, wherein the information related to the uniform resource identifier of the user-customized content resource comprises a uniform resource identifier template, wherein the uniform resource identifier of the user-customized content resource is generated based on the uniform resource identifier template.

14. The apparatus according to claim 13, wherein the customized content resource registration interface further designates:

a mapping relation between a variable in the uniform resource identifier template and a property of the user-customized content resource.

15. The apparatus according to claim 12, wherein the functionality interface of the configuration component comprises a content resource view registration interface, and the content resource view interface at least designates:

a name of content resource wherein a user is represented;
information for designating a represented content resource view.

16. The apparatus according to claim 15, wherein the represented content resource comprises at least one of the system default content resource and the user-customized content resource.

17. The apparatus according to claim 11, wherein deactivating one or more content resources in the content resources obtained from the content server comprises at least one of:

not uploading one or more content resources deactivated; and not representing a view of a link related to the deactivated content resource while representing views of other content resources except for the deactivated content resources; and if the deactivated one or more content resources include root content resources, removing the deactivated root resources from the system core home document so that the deactivated root resources cannot be linked through the system core home document.

18. The apparatus according claim 17, wherein the functionality interface of the configuration component comprises a deactivated content resource registration interface at least used to designate a name of the deactivated content resource.

19. A computer program product comprising a non-transitory computer readable medium encoded with computer executable program code, wherein the code enables execution across one or more processors for communicating with a content server to obtain a content resource stored in the content server;

uploading a configuration component defining a functionality interface for managing the content resource;

managing the content resource obtained from the content server based on the configuration component, wherein managing the content resource obtained from the content server based on the configuration component includes:

uploading a user-customized content resource from the content server based on the configuration component, wherein the user-customized content resource is different from a system default content resource;

if the user-customized content resource is a root content resource, registering the user-customized content resource in a system core home document based on the configuration component, whereby the user-customized content resource is linked through the system core home document; and deactivating one or more content resources in the content resource obtained from the content server based on the configuration component, wherein deactivating the one or more content resources includes removing a link relevant to a deactivated content resource while uploading other content resources except for the deactivated content resources.

* * * * *